Sept. 23, 1958  A. G. CICCHETTI ET AL  2,852,789
HEEL SEAT FITTING MACHINES

Filed Oct. 18, 1956  12 Sheets-Sheet 1

*Inventors*
Ferman N. Lee, Dec'd
Dolores R. Lee, Exrx.
Alfred G. Cicchetti
Harold J. Tabbut
George L. Tura
By their Attorney

*Inventors*
Ferman N. Lee, Dec'd
Dolores R. Lee, Exrx.
Alfred G. Cicchetti
Harold J. Tabbut
George L. Tura
By their Attorney Sept. 23, 1958  A. G. CICCHETTI ET AL  2,852,789
HEEL SEAT FITTING MACHINES
Filed Oct. 18, 1956  12 Sheets-Sheet 3
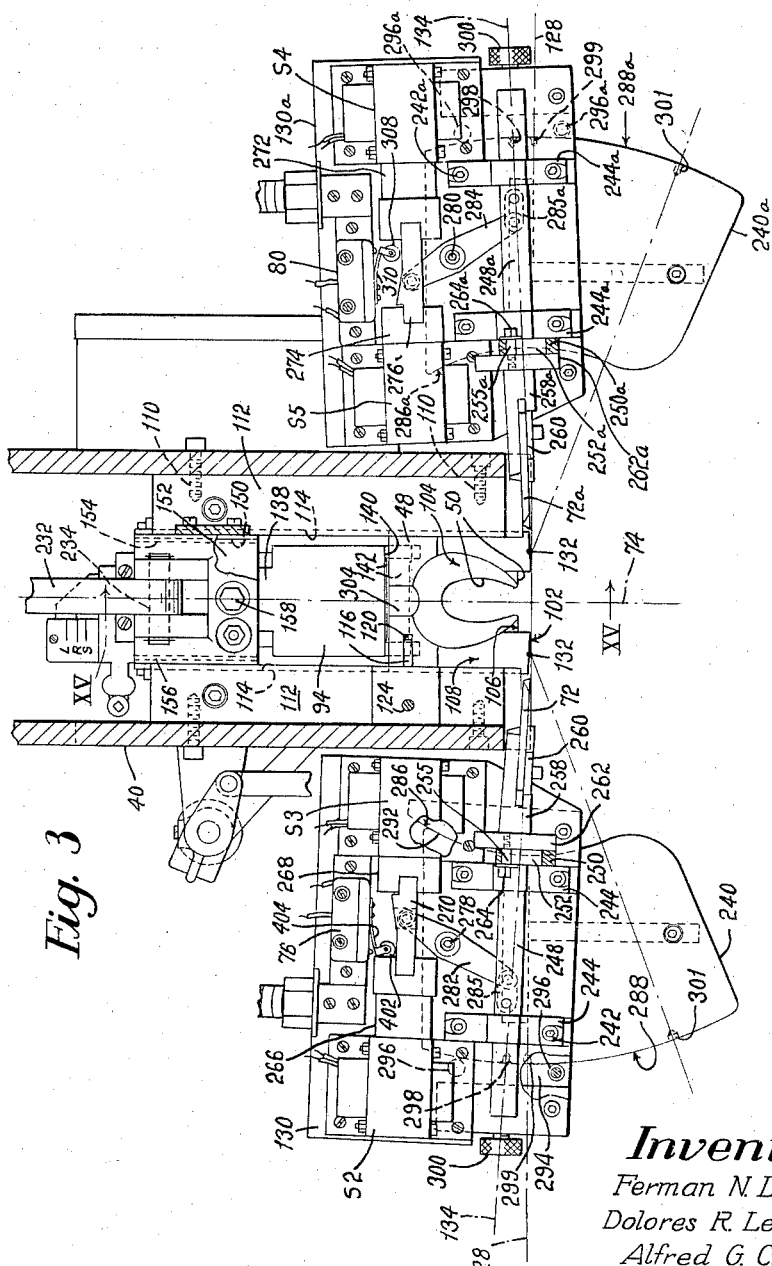
Fig. 3
*Inventors*
Ferman N. Lee, Dec'd
Dolores R. Lee, Exrx.
Alfred G. Cicchetti
Harold J. Tabbut
George L. Tura
By their Attorney

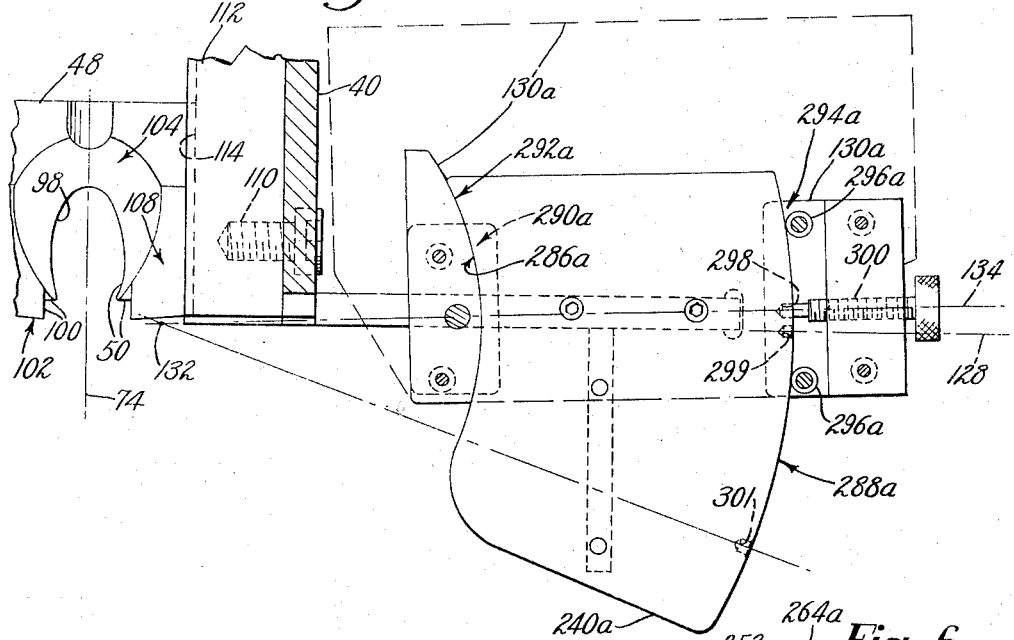
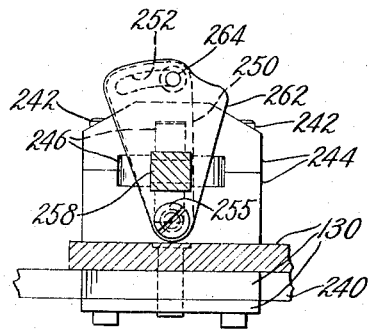
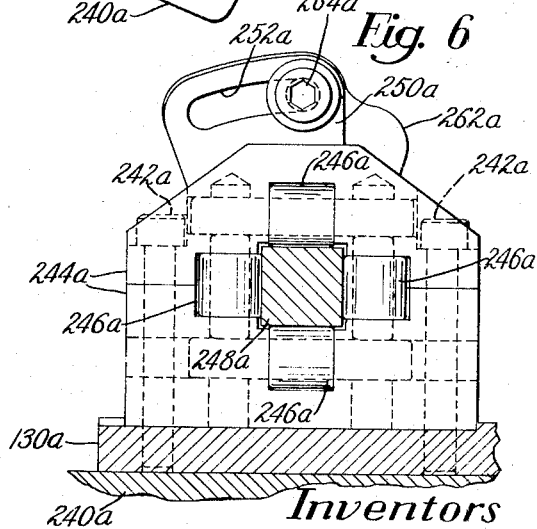

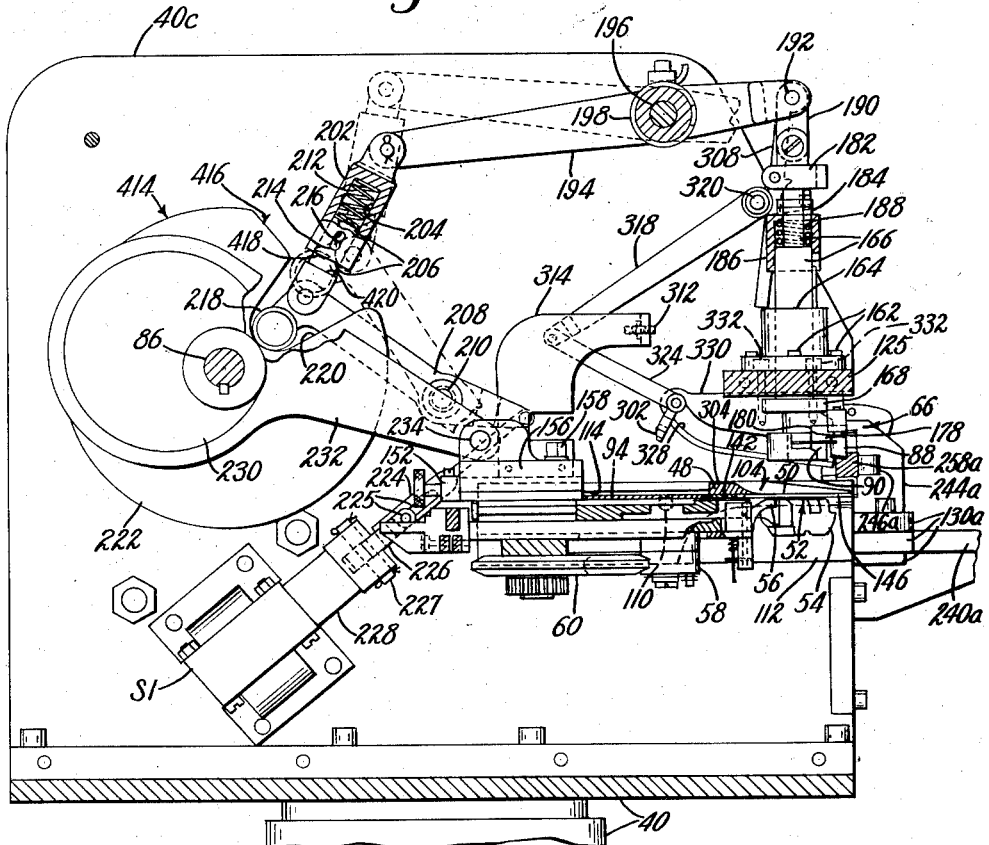
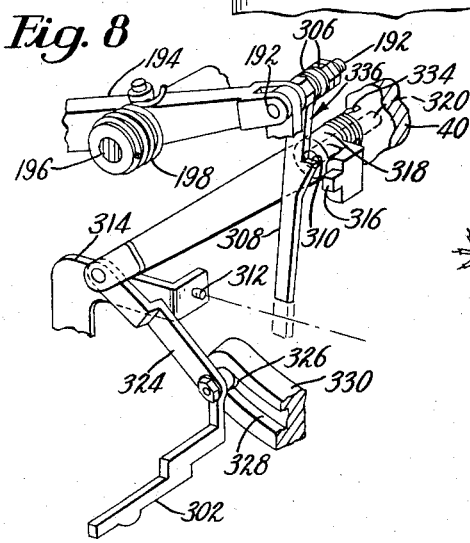
Fig. 7
Fig. 8
Fig. 9
Inventors
Ferman N. Lee, Dec'd
Dolores R. Lee, Exrx.
Alfred G. Cicchetti
Harold J. Tabbut
George L. Tura
By their Attorney Sept. 23, 1958　　A. G. CICCHETTI ET AL　　2,852,789
HEEL SEAT FITTING MACHINES Filed Oct. 18, 1956　　12 Sheets—Sheet 6

*Inventors*
Ferman N. Lee, Dec'd
Dolores R. Lee, Exrx.
Alfred G. Cicchetti
Harold J. Tabbut
George L. Tura
By their Attorney Sept. 23, 1958 A. G. CICCHETTI ET AL 2,852,789
HEEL SEAT FITTING MACHINES
Filed Oct. 18, 1956 12 Sheets-Sheet 7

Inventors
Ferman N. Lee, Dec'd
Dolores R. Lee, Exrx.
Alfred G. Cicchetti
Harold J. Tabbut
George L. Tura
By their Attorney

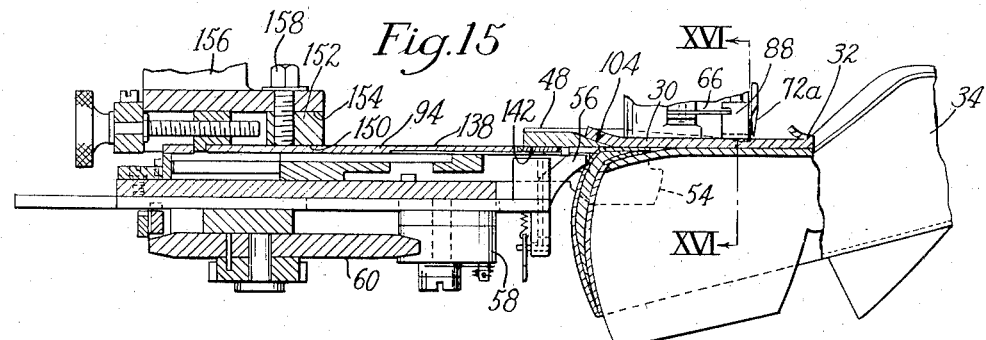
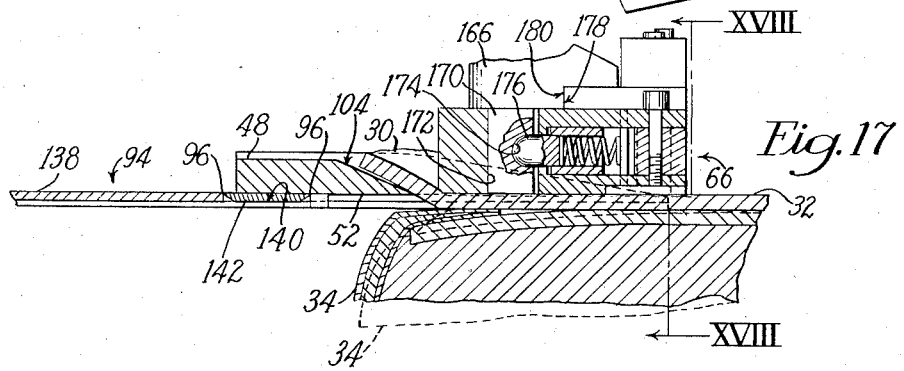
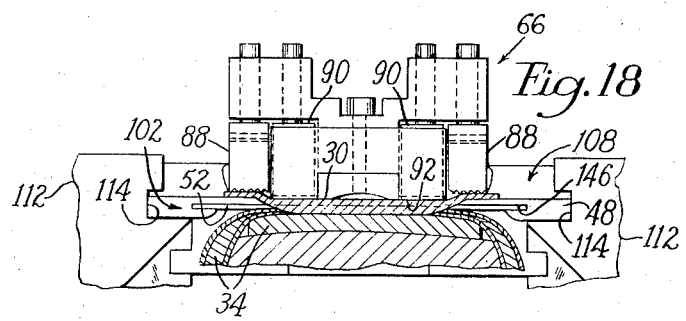
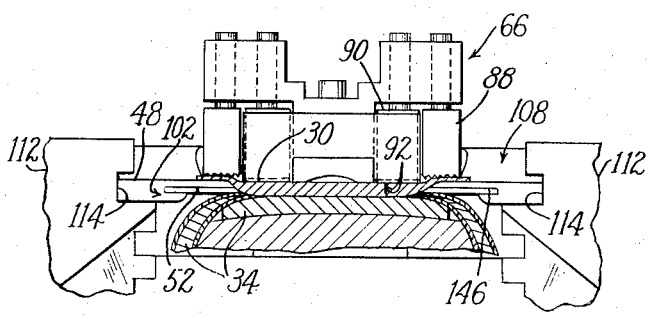
*Inventors*
Ferman N. Lee, Dec'd
Dolores R. Lee, Exrx.
Alfred G. Cicchetti
Harold J. Tabbut
George L. Tura
By their Attorney Sept. 23, 1958   A. G. CICCHETTI ET AL   2,852,789
HEEL SEAT FITTING MACHINES
Filed Oct. 18, 1956   12 Sheets-Sheet 9
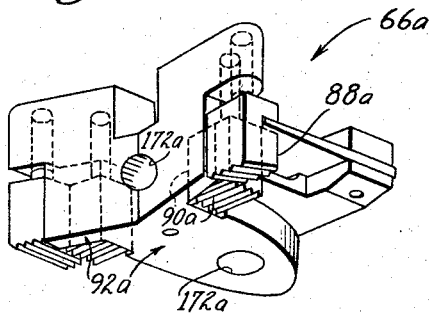
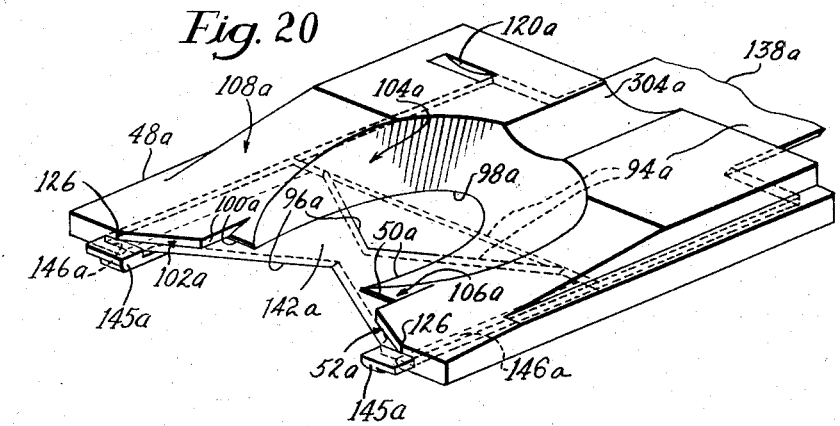
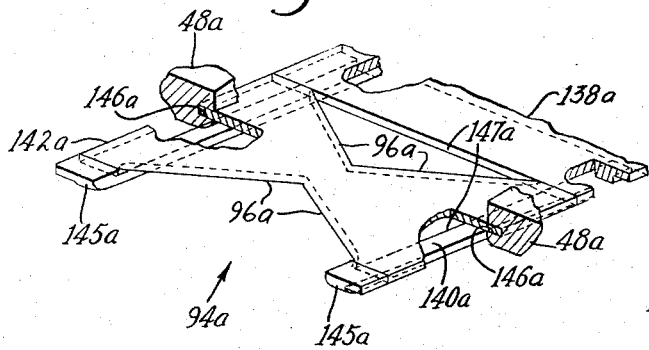
*Inventors*
Ferman N. Lee, Dec'd
Dolores R. Lee, Exrx.
Alfred G. Cicchetti
Harold J. Tabbut
George L. Tura
By their Attorney Sept. 23, 1958 A. G. CICCHETTI ET AL 2,852,789
HEEL SEAT FITTING MACHINES
Filed Oct. 18, 1956 12 Sheets-Sheet 10

*Inventors*
Ferman N. Lee, Dec'd
Dolores R. Lee, Exrx.
Alfred G. Cicchetti
Harold J. Tabbut
George L. Tura
By their Attorney

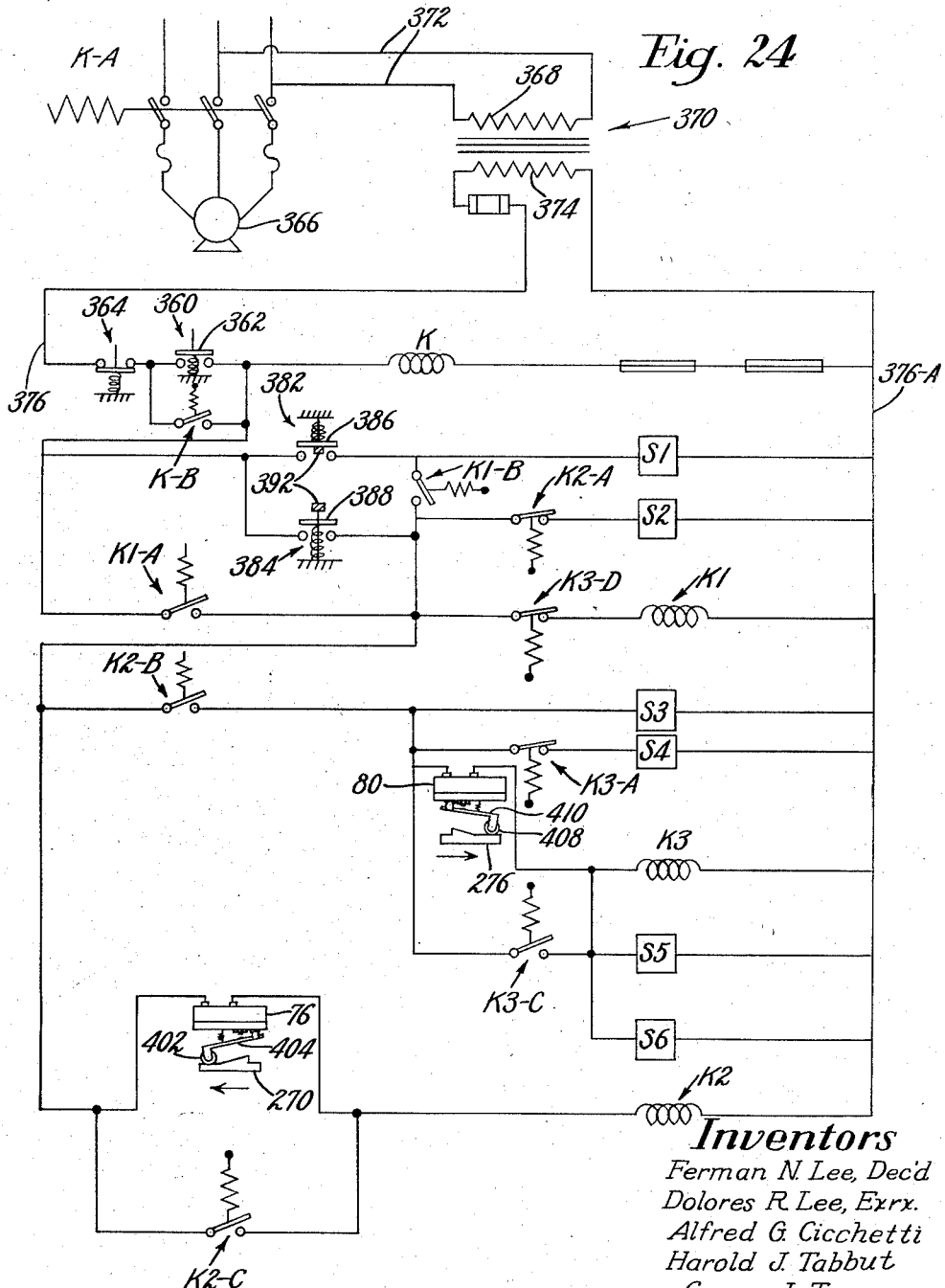

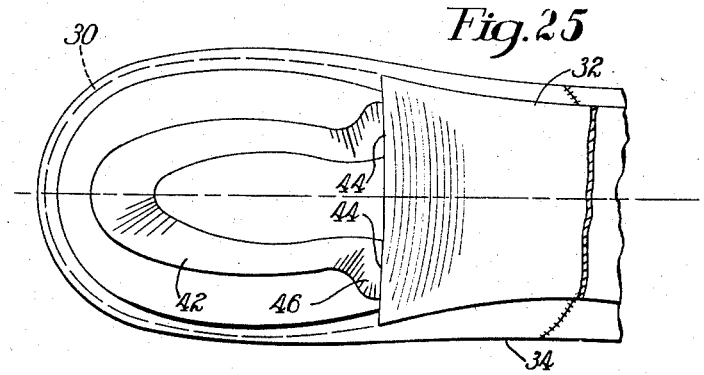
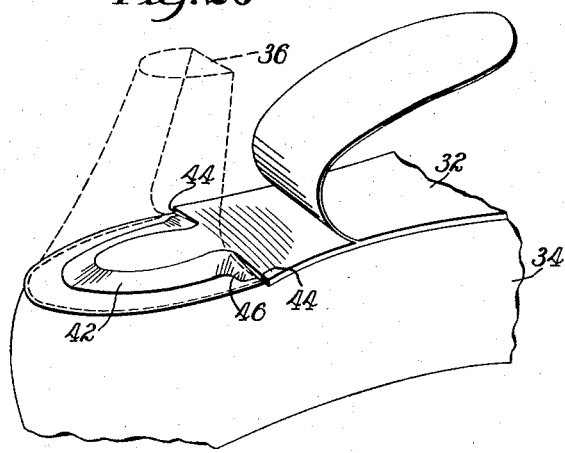
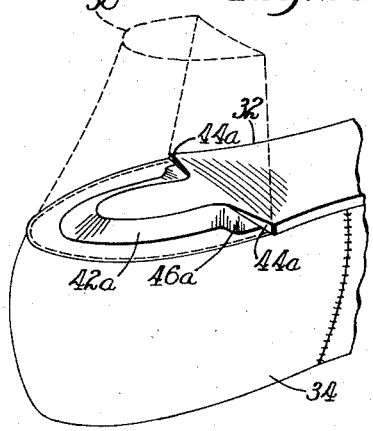
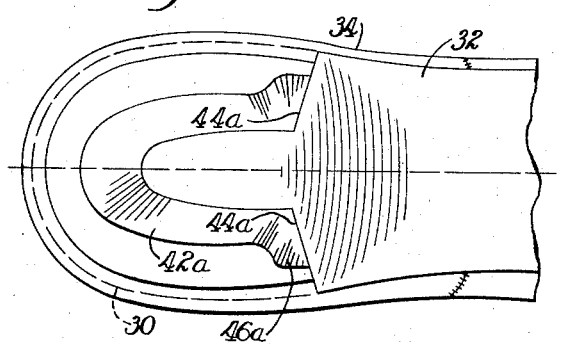
Inventors
Ferman N. Lee, Dec'd
Dolores R. Lee, Exrx.
Alfred G. Cicchetti
Harold J. Tabbut
George L. Tura
By their Attorney

United States Patent Office 2,852,789
Patented Sept. 23, 1958

2,852,789

HEEL SEAT FITTING MACHINES

Alfred G. Cicchetti and Harold J. Tabbut, Beverly, and George L. Tura, Melrose, Mass., and Ferman N. Lee, deceased, late of Danvers, Mass., by Dolores R. Lee, executrix, Danvers, Mass., assignors to United Shoe Machinery Corporation, Flemington, N. J., a corporation of New Jersey Application October 18, 1956, Serial No. 616,884

9 Claims. (Cl. 12—31.5)

This invention relates to machines for fitting the heel seat portions of outsoles of women's shoes for the reception of wood heels and is illustrated as embodied in an improved heel seat fitting machine of the general type disclosed in United States Letters Patent 2,798,235, granted July 9, 1957, upon an application filed in the names of Ferman N. Lee et al.

It is an object of the invention to provide a heel seat fitting machine which is fast and effective in its operation, cheap to manufacture and which requires a minimum amount of physical effort on the part of the operator.

With the above object in view and in accordance with one feature of the present invention the illustrative machine is provided with power means responsive to movement of a manually controlled member to one recognizable position for forcing with initial pressure a clamp and bulger unit against an attached outsole of a shoe on a crease plate having an opening and a face bordering said opening whereby to clamp said outsole against the crease plate preparatory to forming heel breast receiving shoulders on the outsole. In accordance with another feature of the invention the illustrative machine is provided with solenoid actuated mechanism which is responsive to movement of said manually controlled member to a second recognizable position and which is adapted to operate in succession a pair of shoulder forming knives to form said heel breast receiving shoulders. In accordance with a further feature of the invention, the illustrative machine is provided with power actuated mechanism which is operative in response to movement of one of the shoulder forming knives to a predetermined position and is adapted to cause the clamp and bulger unit to bulge the median part of the heel seat portion of the outsole through the opening in the crease plate and beyond said face of the plate and thereafter to cause a back knife to move along said face of the crease plate to form a heel seat tab on said outsole.

The present invention consists in the above-mentioned novel features and hereinafter described novel features including an improved back or tab forming knife, reference being had to the accompanying drawings which illustrate one embodiment of the invention selected for purposes of illustration, said invention being fully disclosed in the following description and claims.

In the drawings,

Fig. 3 is a section on the line III—III of Fig. 2, portions of the machine having been broken away;

Fig. 4 is a section on the line IV—IV of Fig. 2 showing a mechanism for varying the path of movement of a right shoulder forming knife of the machine in accordance with the type of work being operated upon, a similar mechanism being provided to vary the path of movement of the left shoulder forming knife of the machine;

Figs. 5 and 6 are sections on the lines V—V and VI—VI respectively of Fig. 2 showing a mechanism for guiding the shoulder forming knives and for initially orienting said knives;

Fig. 7 is a section on the line VII—VII of Fig. 2;

Fig. 8 shows in perspective portions of an ejector of the illustrative machine;

Fig. 9 is a vertical longitudinal section through a treadle box which is illustrated in Fig. 1 and is used to control the operation of the illustrative machine;

Fig. 15 is a vertical longitudinal section, partly broken away, on the line XV—XV of Fig. 3 showing the heel seat portion of an attached outsole of a shoe, which is to receive a Louis heel and is clamped between a clamp and bulger unit and a crease plate, preparatory to forming heel breast receiving shoulders on said outsole;

Fig. 16 is a section, partly broken away, on the line XVI—XVI of Fig. 15;

Fig. 17 is a view similar to Fig. 15 with some parts of the machine shown in that figure removed and others added showing the heel seat portion of the attached outsole of the shoe deformed between the crease plate and the clamp and bulger unit preparatory to operating the tab forming knife shown in Fig. 11 to reduce the heel seat portion of the outsole;

Fig. 18 is a section on the line XVIII—XVIII of Fig. 17;

Figs. 19 and 20 are views corresponding to Figs. 13 and 14 respectively showing a clamp and bulger unit on the one hand and a crease plate on the other hand used in the fitting of the heel seat portions of shoes for the reception of Cuban heels, a Cuban tab forming knife being shown at the forward end of its stroke beneath the crease plate;

Fig. 21 is a perspective view, partly in section, of the tab forming knife shown in Fig. 20;

Fig. 24 is a wiring diagram for use in describing the operation of the illustrative machine;

Figs. 25 and 26 are bottom and perspective views respectively of the heel end of a shoe which has been fitted by the use of the illustrative machine for the reception of a Louis heel; and Figs. 27 and 28 are bottom and perspective views respectively of the heel end of a shoe which has been fitted in the above machine equipped for Cuban work.

Figure 1:
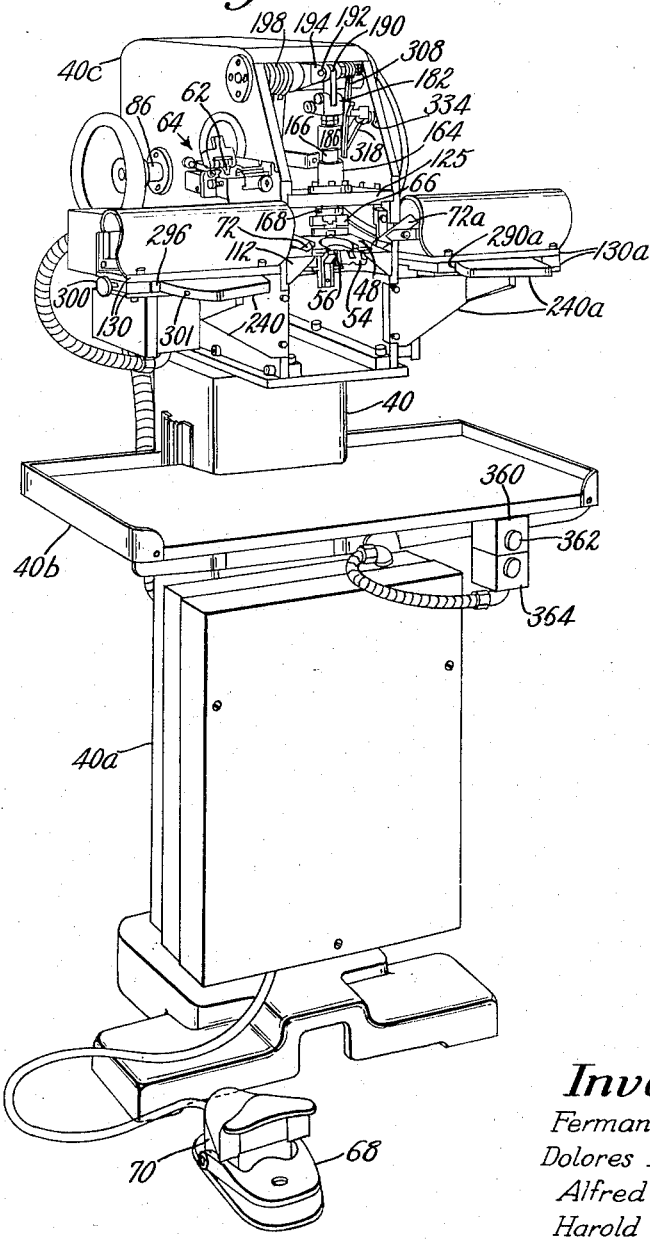
Fig. 1 is a perspective view of the illustrative machine.

The illustrative machine is described with reference to fitting the heel seat portions 30 of attached outsoles 32 of shoes 34 for the reception of Louis and Cuban heels 36, 38, respectively (Figs. 26 and 28) and includes a main frame 40 comprising a pedestal 37 (Fig. 1), a table 39 and an operating head 41 in which work supporting, positioning and trimming instrumentalities are mounted.

In fitting the heel seat portions of attached outsoles of shoes for the reception of Louis and Cuban heels, it is common practice to remove material from the margins of said heel seat portions by beveling cuts whereby to form, respectively, heel seat tabs 42, 42c (Figs. 27 and 28) and pairs of heel breast receiving shoulders 44, 44c. The heel seat tabs 42, 42c have formed at their forward lateral margins wings or fillets 46, 46c which are engaged, respectively, by the forward lateral portions of the attaching faces of the Louis and Cuban heels, 36, 38 subsequently attached to the shoes 34, thus insuring that the rear lateral margins of the shanks of the outsoles 32 of the finished shoes shall be held securely against the bottoms of the uppers of said shoes by the heels attached to the shoes.

Figure 11:
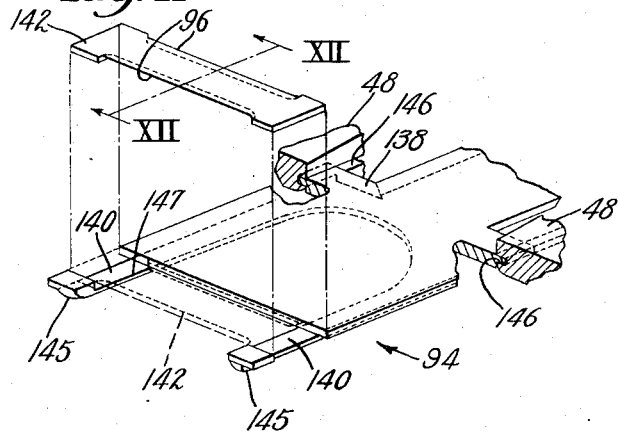
Fig. 11 is an exploded view showing in perspective one type of tab forming knife used in the illustrative machine when operating upon Louis work.
Figure 12:
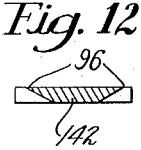
Fig. 12 is a section on the line XII—XII of Fig. 11.
Figure 13:
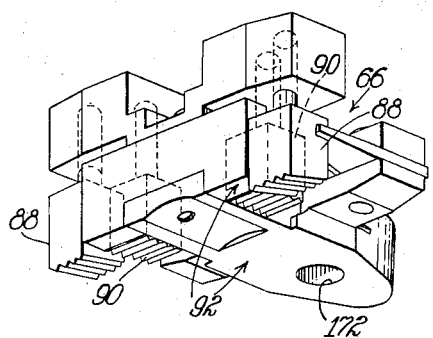
Fig. 13 is a perspective view of a clamp and bulger unit used in the machine equipped for operating upon Louis work.

The present heel seat fitting machine, as is common practice in the art, is adapted to fit shoes for the reception of Louis and Cuban heels 36, 38, respectively. In the use of the machine, which for the most part is illustrated as equipped for operating upon Louis work, crease plates 48, 48c, clamp and bulger units 66 (Fig. 13), 66c (Fig. 19), and tab forming knives 94 (Fig. 11), 94c (Fig. 21) may be used interchangeably in the machine in accordance with whether the shoes are being fitted for the reception of Louis or Cuban heels. Corresponding crease plates 48, 48c, clamp and bulger units 60, 60c and tab forming knives 94, 94c are substantially identical in construction and accordingly, in order to save duplication of description, corresponding crease plates, clamp and bulger units, and tab forming knives used to accommodate Louis and Cuban work are being given the same reference numerals, the various members which are used to accommodate Cuban work being distinguished from the members used to accommodate Louis work by the addition of the suffix "c" to the numerals.

Figure 14:
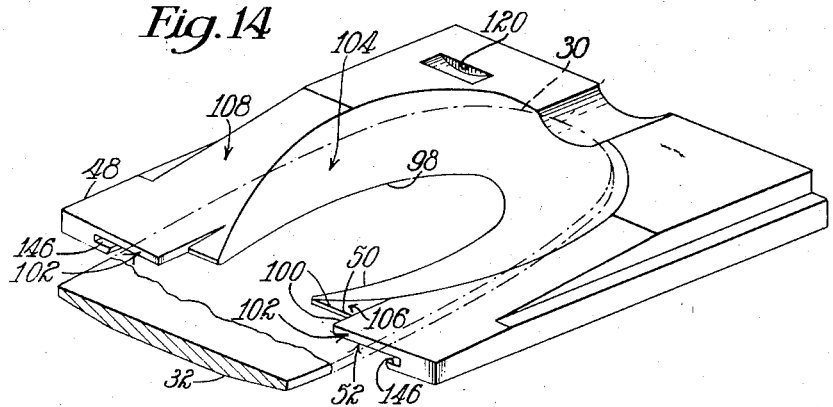
Fig. 14 shows in perspective a crease plate which cooperates with the bulger shown in Fig. 13 to clamp and bulge the heel seat portion of an outsole of a shoe preparatory to forming on the outsole heel breast receiving shoulders and a heel seat tab.

The shoe 34 is presented heel end first and bottom up to the machine with the heel seat portion 30 of the attached outsole 32 of the shoe overlying the fixed Louis or Cuban crease plates 48, 48c (Figs. 14, 20), respectively which have openings 50, 50c and flat or planar bottom faces 52, 52c bordering said openings. In presenting the shoe to the machine the rear end of the counter portion of the shoe is pressed against a centralizing gage or fork 54 (Figs. 1, 2, 7, 15) which is arranged beneath the crease plate 48, 48c and is yieldable in a rectilinear path, to position the shoe widthwise and is thereafter pressed against a back gage 56 which slides lengthwise of said path under pressure of work together with the centralizing fork, until a block 58 operatively connected to a heel gage 64 (Figs. 1, 2) engages a spiral cam or stop 60 (Fig. 7) initially positioned in accordance with the setting of a movable abutment 62 of said heel gage which is adapted to measure the heel 36, 38, to be attached to the shoe 34, lengthwise. The heel gage 64 and mechanism for operatively connecting said gage to the spiral stop 60 and for positioning the shoe 34 in the machine in accordance with the setting of said stop are substantially identical with corresponding means disclosed in United States Letters Patent No. 2,277,076, granted March 24, 1942 on an application filed in the name of William S. Dallas.

When the shoe 34 has been positioned in the machine, as above described, the clamp and bulger unit 66, 66c (Figs. 13, 19) is forced against the grain side of the heel seat portion 30 of the outsole 32 of the shoe in response to depressing a treadle or control lever 68 (Figs. 1, 9) of a treadle box 70, hereinafter described, to one or a first recognizable position thereby causing said heel seat portion to be clamped without any substantial bulging against the crease plate 48, 48a to positions shown in Figs. 15 and 16, respectively. The clamp and bulger units 66, 66c are operated by mechanism, hereinafter disclosed, and are powered respectively by a solenoid S1 (Figs. 7, 24) which is controlled by the treadle box 70, the construction and arrangement of said mechanism and the associated means for controlling and operating it being such that if the work is not properly positioned in the machine by the operator, by releasing the treadle 68, causes the clamp and bulger units 66, 66c to be raised away from the work preparatory to correctly positioning the work in the machine. After clamping the work in the machine to his satisfaction the operator depresses the treadle 68 to a second recognizable position hereinafter referred to with the result that a solenoid S2 (Figs. 2, 3, 24) is energized causing a shoulder forming knife 72 to be moved from a retracted position or from the left as viewed in Figs. 2 and 3 inwardly toward a central heightwise plane 74 of the crease plate 48, 48c in the machine and accordingly of the heel seat portion 30 of the shoe 34 positioned in the machine to form one of the heel breast receiving shoulders 44, 44c. As the shoulder forming knife 72 reaches the end of its inward movement or cutting stroke a normally open switch 76 is closed causing the solenoid S2 and a solenoid S3 to be simultaneously deenergized and energized respectively as will be explained and accordingly the shoulder forming knife 72 to move outwardly or away from the central plane 74 and also causing a solenoid S4 to be energized to move a shoulder forming knife 72a from a retracted position inwardly toward the central heightwise plane 74 whereby to form the other heel breast receiving shoulder 44, 44c.

Figure 10:
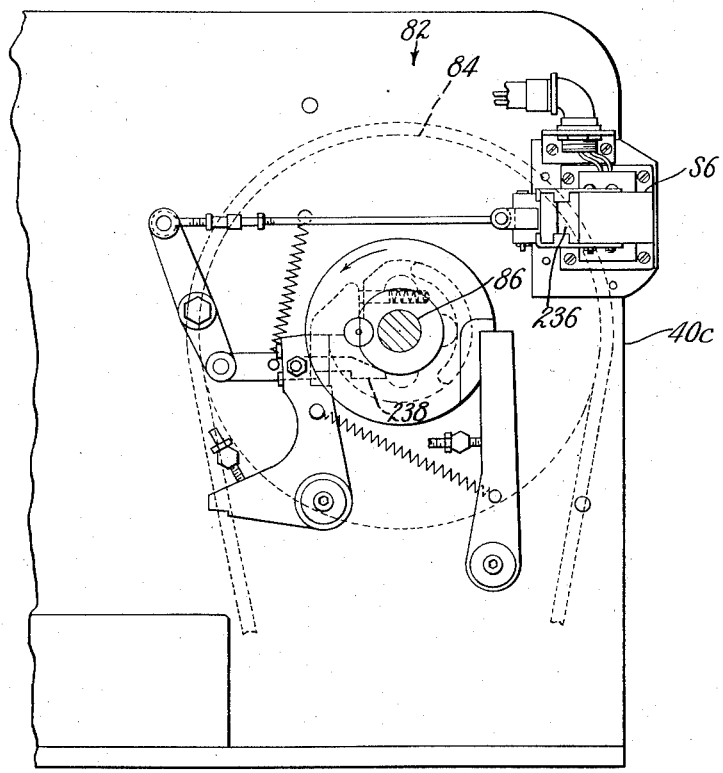
Fig. 10 is a section on the line X—X of Fig. 2 illustrating a clutch which is used to power a clamp and bulger unit and a tab forming knife of the illustrative machine.

As the shoulder forming knife 72a reaches the inward limit of its movement toward the central heightwise plane 74 a normally open switch 80 is closed causing the solenoid S4 and a solenoid S5 to be simultaneously de-energized and energized respectively and accordingly the right shoulder forming knife 72a to move in a reverse direction away from the central heightwise plane 74 back to its retracted position. The closing of the switch 80 also causes a solenoid S6 secured to the main frame 40 to be energized whereby to trip a one-revolution clutch 82 (Figs. 2, 10) and thus to secure a continuously driven pulley 84, which is rotatable upon a shaft 86 journaled in bearings in the main frame 40, to said shaft 86. When the shaft 86 is rotated, mechanism hereinafter described and operatively connected to said shaft causes yieldable clamps 88, 90, 88c, 90c (Figs. 16, 19) of the clamp and bulger units 66, 66c to be forced yieldingly against the heel seat portion 30 of the outsole 32 of the shoe 34 on the crease plate 48, 48c and also causes flat T-shaped faces 92 (Figs. 13, 16, 18), 92c (Fig. 19) of the clamp and bulger units 66, 66c to be forced into hereinafter described U-shaped and entrance portions of the openings, 50, 50c in the crease plates whereby to press the median and forward parts of the heel seat portions of the outsoles below the flat bottom faces 52, 52c of the plates continued rotation of the shaft causing heel seat reducing, back or tab forming knives 94 (Fig. 11), 94c (Figs. 20, 21) to be moved respectively forwardly substantially along the faces 52, 52c of the crease plates and the faces 92, 92c of the clamp and bulger units to positions in which a leading cutting edge of pairs of cutting edges 96, 96c of the knives just cross the paths of travel of the respective shoulder forming knives 72, 72a whereby to form the heel seat tabs 42, 42c, said back knives then being returned to their rear or retracted starting positions. The pulley 84 is disengaged from the shaft 86 after one revolution of the shaft which is stopped in its starting position, best shown in Figs. 7 and 10, by means hereinafter described.

The openings 50, 50c of the crease plates 48, 48c are defined, respectively, by U-shaped edges 98, 98c and by spaced angularly disposed edges 100, 100c which are continuous, respectively, with the forward ends of the U-shaped edges and extend outward from the U-shaped edges and then forward in the form of steps to breast edges 102, 102c of the crease plates. The angularly disposed edges 100, 100c may be said to define entrance or forward portions of the opening 50, 50c respectively. The U-shaped edges 98, 98c which define the U-shaped portions of the opening 50, 50c, extend between the flat bottom faces 52, 52c of the crease plates 48, 48c and beveled horseshoe-shaped or sole supporting faces 104, 104c of the plates and the angularly disposed edges 100, 100c of the plates have sharp rear portions, which define the junction of said flat bottom faces 52, 52c and forward beveled faces 106, 106c, and have lateral portions which extend between said flat bottom faces and forwardly beveled faces 108, 108c of the crease plates.

The heel seat portions 30 of the outsoles 32 of the shoes 34 are usually somewhat wider than the forward or entrance portions of the openings 50, 50c of the crease plates 48, 48c. The openings 50, 50c of the crease plates 48, 48c may be described as extending thicknesswise through the crease plates and as having converging or dished faces 104, 104c and a planar flat or lower faces 52, 52c which border the openings.

Secured to the main frame 40 by screws 110 are headers 112 having formed in them opposed guideways 114 adapted slidingly to receive the lateral margins of the crease plates 48, 48c, respectively. The crease plates 48, 48c may be readily located in fixed operating positions lengthwise of the guideways by a positioning or retaining lug 116 (Figs. 2, 3) which is fulcrumed on a bearing pin 118 secured to the main frame 40 and is adapted to enter a recess 120, 120c in the upper surfaces of the plates and which is constantly urged clockwise as viewed in Fig. 2 by a spring 122. Preparatory to changing crease plates 48, 48c the lug 116 is raised from the recesses 120, 120c in the crease plates by depressing a push rod 124 which is slidingly mounted in a crossbar 125 of the main frame 40 and upward movement of which is limited by a collar secured to said rod.

The back knives 94 (Fig. 11), 94c (Figs. 20, 21) comprise holder or holder portions 138, 138c having at their forward ends respectively laterally spaced grooves 140, 140c for interchangeably receiving planar blades 142, 142c having the above-mentioned pairs of cutting edges 96, 96c, only the leading one of which is operatively effective. The grooves 140, 140c have a depth equal to the thickness of associated blades 142, 142c. The blades 142, 142c are of a width equal to the widest parts of the holder portions 138, 138c of the knives 94, 94c, and have lateral margins fitting slidingly in alinement with thin lateral margins of said holder portions in guideways 146, 146c which are formed in the crease plates 48, 48c, lateral end faces of the plates substantially engaging the inner faces of the guideways and the cutting edges 96, 96c of said blades sliding along the planar bottom faces 52, 52c of the crease plates. The guideways 146, 146c extend lengthwise along the opposite sides of the bottom faces 52, 52c of the crease plates 48, 48c and comprise upper surface which are continuous with said faces, said guideways serving to insure against the knives "dipping" away from the bottom faces of the crease plates during their tab forming strokes. The holders 138, 138c of the knives 94, 94c may be described as having at their leading ends spaced forwardly projecting fingers 145, 145c in which the grooves 140, 140c are formed. The holders 138, 138c may also be described as having extending thicknesswise through them, at their forward ends, openings 147, 147c lateral portions of which are defined by the fingers 145, 145c and forward or entrance portions of which are bridged respectively by the blades 142, 142c. The knives 94, 94c may be described as having leading transversely extending cutting edges 96, 96c, and as having opening 147, 147c which are substantially coextensive laterally with the knives.

A dovetail portion of the knife holder 138 fits in a groove 150 (Figs. 3, 15) formed in the bottom of a carrier 152 adapted to fit in a groove 154 of a slide 156 which is operatively connected to the shaft 86 by mechanism hereinafter described and is slidable in the guideways 114 of the machine. The carrier 152 and the rear dovetail portions of the back knives 94, 94c are identical with the carrier (318) and the rear end of the knife (48) disclosed in United States Letters Patent No. 1,980,371, granted November 13, 1934 on an application filed in the name of Earl A. Bessom. The carrier 152 is secured to the slide 156 by a screw 158 which passes through a bore in the slide and is threaded into a recess of the carrier in the same manner that the carrier (318) disclosed in said Letters Patent No. 1,980,371 is secured to a lug (334) of an operating slide (302). Since the illustrative mechanism for initially securing the back knives 94, 94c respectively in different adjusted positions to the carrier 152 and for securing the carrier to the slide 156 is identical to corresponding mechanism disclosed in said Patent No. 1,980,371 no further description of this mechanism herein is believed to be necessary.

As explained in said Patent No. 2,798,235, when the machine is to fit for the reception of Louis heels 36, the heel seat portions 30 of attached outsoles 32 of shoes 34 having shanks which are flat transversely, the Louis crease plates 48 are so positioned in the guideways 114 by the lug 116 that their breast edges 102, which are disposed at right angles to the central heightwise plane 74 of the crease plate 48, are disposed in what may be described as a fixed horizontal Louis heel breast line 128 of the machine. The Cuban crease plates 48c positioned in the guideways 114 by the lug 116 have outer ends 126 (Fig. 20) of their breast edges 102 arranged in the fixed heel breast line 128.

In order to change from Louis to Cuban work, multipart mounts 130, 130a, which will be hereinafter referred to and upon which the shoulder forming knives 72, 72a and mechanism for operating them are mounted, are initially adjustable into different operative positions about fixed axes 132 (Figs. 3, 4) which correspond to the vertical axes (239) of the machine disclosed in said Patent No. 2,798,235 but which are located just rearward of said axes and pass substantially through points corresponding to the points of intersection (109) of Louis and Cuban heel breast lines (111) and (211) of the machine disclosed in said application. As in the case of the machine disclosed in Patent No. 2,798,235 three different Louis and three different Cuban crease plates 48, 48c are provided to accommodate runs of shoes to be fitted, respectively, for the reception of Louis and Cuban heels.

In order to compensate for the common tendency of the outer end portions of the heel breast receiving shoulders 44 to shift slightly forward with relation to the inner portions of said shoulders between the time they are formed and the time they assume their positions adjacent to the shoe bottom, the shoulder forming knives 72, 72a may be moved along paths 134 which are disposed at a very slight angle, for example 5° to the fixed heel breast line 128 and which extend forwardly as they extend inwardly toward the central heightwise plane 74 of the crease plates positioned in the machine. When the machine is operating upon this type of Louis work the breast edges 102 of the crease plates are slabbed back about 5° so as to extend rearwardly as they extend outwardly thereby insuring that the crease plates shall not be engaged by the shoulder forming knives 72, 72a.

The cross bar 125 (Figs. 1, 2, 7) of the main frame 40 has secured to it by screws 162 a bearing boss 164 in which is mounted for vertical sliding movement a rod 166 to the lower end of which is secured a collar 168 having a depending holder stud 170 (Figs. 17, 23) adapted to be received in bores 172, 172c of the clamp and bulger units 66, 66c respectively, said stud having formed in it a recess 174 for receiving a spring-pressed retaining pin 176 carried by the combined clamp and bulger unit 66. The pin 176 serves to hold the associated clamp and bulger unit 66 in its desired operating position upon the holder stud 170 and to retain it in such a position with the shoulders 178 of the holder stud in abutting relation with the shoulders 180 of the combined clamp and bulger unit 66. The rod 166 has threaded onto its upper end a coupling 182 (Figs. 1, 2, 7) and has also threaded onto it a stop nut 184 against which a sleeve 186 movable with the rod is forced by a spring 188. Downward movement of the rod 166, which is operated by mechanism hereinafter described, is limited by the engagement of the sleeve 186 with the top of the bearing box 164 which is secured to the cross bar 125 of the main frame 40. The operating position of the sleeve 186 on the rod 166 may be varied by varying the position of the nut 184 on the rod.

The coupling 182 has pivoted to it a link 190 operatively connected by a pin 192 to a lever 194 journaled on a bearing pin 196 secured to the main frame 40, said lever being constantly urged counterclockwise as viewed in Fig. 7 by a torsion spring 198 one end of which is attached to a screw secured to the main frame 40 and the other end of which is attached to a screw attached to a bearing sleeve of the lever. Pivoted to the rear end of the lever 194 is a hollow rod 202 having a bore 204 for receiving a rod 206 pivoted to a rear arm of a lever 208 fulcrumed on a bearing pin 210 secured to the main frame 40, a spring 212 being positioned in the bore 204 and adapted, when the machine is idle (as viewed in Fig. 7) to force a pin 214 carried by the rod 206 into engagement with the lower ends of the slots 216 (only one shown) formed in the hollow rod 202, a roll or cam follower 218 rotatably mounted in the rear arm of the lever 208, which is pivotally connected to the rod 206, at this time being forced against the bottom of a recess 220 formed in a cam 222 secured to the drive shaft 86. The purpose of the rods 202, 206, which may be referred to collectively as a multipart yieldable rod, will be explained later. A forward arm of the lever 208 is pivotally connected to a link 224 operatively connected through a pin and slot connection 225 to a coupling 226 journaled on a pin 227 carried by a slidable core 228 of the solenoid S1.

Keyed to the drive shaft 86 is a crank 230 having mounted on it a connecting rod 232 operatively connected to a coupling pin 234 mounted on the slide 156 to which the knife carrier 152 is secured. As above explained, when the operator has depressed the treadle 68 to the above-mentioned first recognizable position, the solenoid S1 is energized thus causing the lever 208, the roll 218, the multipart rod 202, 206, and the lever 194 to be moved to their dash line positions shown in Fig. 7 and thus causing the clamp and bulger unit 66, 66c to force the heel seat portion 30 of the outsole 32 against the crease plate 48, 48c shown in Figs. 15 and 16, an automatic control system hereinafter described in detail being so constructed that the solenoid S1 is de-energized upon removal of the operator's foot from the treadle with the result that the above-mentioned operating parts of the machine acted upon by the torsion spring 198 return to their full line idle positions shown in Fig. 7, the roll 218 at such time being in engagement with the bottom of the recess 220.

The one-revolution clutch 82 is tripped in response to the energizing of the solenoid S6 which has a sliding core 236 (Figs. 2, 10) operatively connected to a latch 238 substantially identical with a latch (492) of a one-revolution solenoid operated clutch disclosed in United States Letters Patent No. 2,746,068, granted May 22, 1956 on an application filed in the name of Alfred S. Clark. Since the construction and operation of the clutch 82 is disclosed in detail in said Patent No. 2,746,068 no further detail description of the clutch is believed to be necessary herein.

The sliding mounts 130, 130a upon which the shoulder forming knives 72, 72a and hereinafter described mechanism for operating said knives are mounted are supported upon platforms 240, 240a which are screwed to the main frame 40 and may be considered parts of said frame. Secured by screws 242, 242a (Figs. 2, 3, 5, 6) to the sliding mounts 130, 130a are two-part bearing blocks 244, 244a which have rotatably mounted in them bearing rolls 246 (Fig. 5), 246a (Figs. 6, 7) adapted slidingly to support slide rods 248, 248a which are of square cross section and have secured to their inner ends respectively, flanges 250, 250a having arcuate slots 252, 252a which are centered about horizontal axes respectively extending substantially through the lower ends of cutting edges 254, 254a (Fig. 2) of the shoulder forming knives 72, 72a and including axes of shoulder screws 255, 255a which are threaded into the flanges 250, 250a, respectively.

The knives 72, 72a are mounted upon ledges 256, 256a of knife holders 258, 258a and are secured to said holders by plates 260, 260a screwed to the holders, said holders having flanges 262, 262a which are mounted respectively on the shoulder screws 255, 255a. The shoulder forming knives 72, 72a may be initially set in different adjusted positions about said axes of the shoulder screws 255, 255a by the use of setscrews 264, 264a which are threaded into the flanges 262, 262a, pass through the arcuate slots 252, 252a in the flanges 250, 250a of the slide rods 248, 248a and serve to clamp the knife holders 258, 258a to the slide rods.

As above explained, the shoulder forming knives 72, 72a are operated respectively in timed relation in opposite directions by solenoids S2 and S3 on the one hand and the solenoids S4 and S5 on the other hand. The solenoids S2 and S3 have sliding cores 266, 268 which are connected together by a cam link 270 (Fig. 3) and the solenoids S4 and S5 have sliding cores 272, 274 connected by a cam link 276. Mounted upon fulcrum pins 278, 280 secured to the mounts 130, 130a respectively are levers 282, 284 the rear ends of which are pivotally connected respectively to the cam links 270, 276 and the forward ends of which are operatively connected to the slide rods 248, 248a by links 285, 285a.

The platforms 240, 240a have inner edges 286 (Figs. 2, 3), 286a (Figs. 2, 3, 4) and outer edges 288, 288a, which are centered about the vertical axes 132, 132. The multipart mounts 130, 130a have formed in them guideways 290 (Fig. 2), 290a (Figs. 1, 2, 4) adapted slidingly to receive the inner end portions of the platforms 240, 240a, arcuate edges 292 (Figs. 2, 3), 292a (Figs. 2, 4) of the mounts being complemental to opposing edges 286, 286a of the platforms 240, 240a, and accordingly being centered about the axes 132, 132. The multipart mounts 130, 130a are provided with guideways 294, 294a for slidingly receiving the outer margins of the platforms 240, 240a and have rotatably mounted on them rolls 296, 296a which engage the outer edges 288, 288a of said platforms. As will be hereinafter explained the mounts 130, 130a, together with mechanism mounted thereon, may be set respectively in different positions upon the platforms 240, 240a to adapt the machine for fitting the heel seat portions 30 of attached outsoles 32 of shoes 34 for the attachment of Louis heels 36 or Cuban heels 38. The platforms 240, 240a have formed in their outer edges 288, 288a, holes 298, 299 and 301, adapted selectively to receive in fitting relation the inner ends of screws 300 which are threaded into the mounts 130, 130a. The mounts 130, 130a are so located on the platforms 240, 240a that when the inner ends of the screws 300 register in the recesses 301 the machine is adjusted to fit the heel seat portions 30 of attached outsoles 32 of shoes 34 for the reception of Cuban heels 38 and when the ends of the screws 300 register in the recesses 299 of the mounts, the machine is set to fit the attached outsoles of shoes for the reception of Louis heels 36.

In order to insure that the lips of Louis heels 36 shall be firmly pressed against the outer portions of the heel rest receiving shoulders 44 formed on the heel seat portions 30 of the outsoles 32 of shoes 34 the mounts 130, 130a may be set on associated platforms 240, 240a with screws 300 registering in the holes 298, the cutting edges 254, 254a of the shoulder forming knives 72, 72a traveling in the above-mentioned converging paths 134 which are disposed at about 5° to the fixed Louis heel breast line 128 of the machine along which the lower ends of the cutting edges 254, 254a of the knives 72, 72a travel when the screws 300 register in the holes 299 of the platforms 240, 240a. The forward ends of the crease plates 48 are slabbed off slightly to insure against being engaged by the shoulder forming knives 72, 72a as they move inward along the paths 134.

In order to remove from the crease plates 48, 48c U-shaped chips (not shown) trimmed from the heel seat portions 30 of the outsoles 32 of shoes 34 there is provided a chip ejector 302 which is moved by mechanism, hereinafter described, lengthwise of the crease plates 48, 48c in the machine along longitudinal grooves 304 (Figs. 2, 3, 7), 304c (Fig. 20), respectively of said crease plates. Supported upon an extension of the bearing pin 192 is an actuator arm 308 (Figs. 1, 2, 7, 8) provided with a shoulder 310, said arm being constrained against free movement by a pair of leather washers 306 and being in a retracted inactive position shown in Figs. 7 and 8 when the machine is idle. When the clamp and bulger unit 66 or 66c is lowered during the heel seat fitting operation the acuator arm 308 is lowered with it to its dash line position shown in Fig. 8, and during subsequent forward movement of the tab forming knife 94 a screw 312 adjustably secured to a bracket 314 screwed to the slide 156 swings said arm 308 to a vertical waiting position beneath a lug 316 which is formed on a forward arm of a bell crank lever 318 mounted on a bearing pin 320 secured by a nut 322 (Fig. 2) to the main frame 40. Pivotally connected to a rear arm of the bell crank lever 318 is an arm 324 which is formed integral with the ejector 302 and has secured to it a roll 326 slidingly fitting in a groove 328 of a cam plate 330 secured by screws 332 (Fig. 7) to the main frame 40. The bell crank lever 318 is constantly urged clockwise as viewed in Fig. 8 by a torsion spring 334 one arm of which is attached to the main frame 40 and the other end of which is attached to the bell crank lever. When the rod 166 which carries the clamp and bulger unit 66, 66c is raised at the end of the heel seat fitting operation the shoulder 310 of the actuator arm 308 engages the lug 316 on the forward arm of the bell crank lever 318 with the result that said lever is rotated counterclockwise, as viewed in Figs. 7 and 8, upon the fulcrum pin 320 causing the roll 326 to travel along the groove 328 thereby moving the ejector 302 in a predetermined path over the crease plates 48, 48c and along the grooves 304, 304c of the crease plates 48, 48c respectively to remove the U-shaped chips from said plates. The arrangement of the bearing pin 320 is such that as the bell crank lever 318 is rotated by the upwardly moving actuator arm 308 the lug 316 of said lever is forced against a face 336 of said arm causing it to swing about the pin 192 to a position in which the shoulder 310 is moved from beneath the lug 316, the bell crank lever then being free to move clockwise, as viewed in Figs. 7 and 8, under the action of the spring 334 until the roll 326 carried by the link is in engagement with the rear end of the groove 328 in the camplate 330.

Power is supplied to a primary coil 368 (Fig. 24) of a transformer 370 from lines 372 causing a secondary coil 374 of the transformer to be energized and current to be available for trunk lines 376, 377 which are powered and bridged by control circuits hereinafter described. In order to power the machine the operator closes a normally open starting switch 360 by depressing a plunger 362 across contacts of this switch causing a coil K of a relay including this coil to be energized and accordingly causing normally open switches K–A, K–B of this relay to be closed. A safety switch 364 in a circuit with the starting switch 360 is normally closed but may be opened to stop the machine at any time. The closing of the switch K–A effects operation of a motor 366 which is operatively connected to the pulley 84 then rotatable on the shaft 86, the clutch 82 controlled by the solenoid S6 at this time being disengaged. The closing of the switch K–B of the relay including the coil K establishes a holding circuit to maintain the coil K energized after the plunger 362 of the normally open switch 360 is released by the operator.

The powered machine may be operated by the use of the treadle 68 which is secured to a bearing shaft 378 (Fig. 9) journaled in the treadle box 70. Secured to the treadle box 70 are normally closed and open switches 382, 384 having plungers 386, 388 respectively and secured to the shaft 378 is a block 390 having screwed to it an arm 392 front and rear portions of which are at all times engaged respectively by the plungers 386, 388. The terms "normally closed" and "normally open" switches define switches 382 and 384 respectively which are closed and opened by their associated springs unless external forces act upon the switches against the action of these springs. As will be hereinafter clear the normally closed or open switches 382, 384 are open and closed respectively when the machine is at rest. The treadle 68 is constantly urged counterclockise, as viewed in Fig. 9, by a weak spring 394 mounted on an upstanding boss at the base of the treadle box 70, said counterclockwise movement being limited by the engagement of the treadle with a stop face 396 of the box.

Housed in a recess of the boss is a relatively strong coil spring 398 on which is mounted a stud 400, said stud being vertically slidable in said recess and, when the treadle 68 is raised, being in engagement with an inturned flange of the boss. When the operator has depressed the treadle 68 sufficiently to engage the stud 400, the arm 392 has been moved to a first position which is recognized by the operator by reason of the resistance encountered by the treadle and in which the plunger 386 of the switch 382 acted upon by a spring of said switch is allowed to bridge contacts of the switch and thus to close the switch with the result that the solenoid S1 is energized and accordingly yieldable clamps 88, 90 and the flat T-shaped face 92 of the clamp and bulger unit 66 are forced against the heel seat portion 30 of the out sole 32 of the shoe 34 positioned in the machine as shown in Figs. 15 and 16.

When the solenoid S1 is energized the roll 218 which, as above explained, is operatively connected to the solenoid S1 and to the lever 194, is in its dash line position shown in Fig. 7. At this time the operator may release the treadle 68 with the result that the switch 382 is opened and the solenoid S1 is de-energized causing said lever 194 to be moved by the action of the torsion spring 198 to its full line position shown in Fig. 7 until the roll 218 engages the bottom of the recess 220 formed in the then stationary cam 222, the clamp and bulger 66 being raised away from the heel seat portion 30 of the outsole 32 on the crease plate 48 to allow the operator to reposition the work, if necessary, upon the crease plate.

Figure 2:
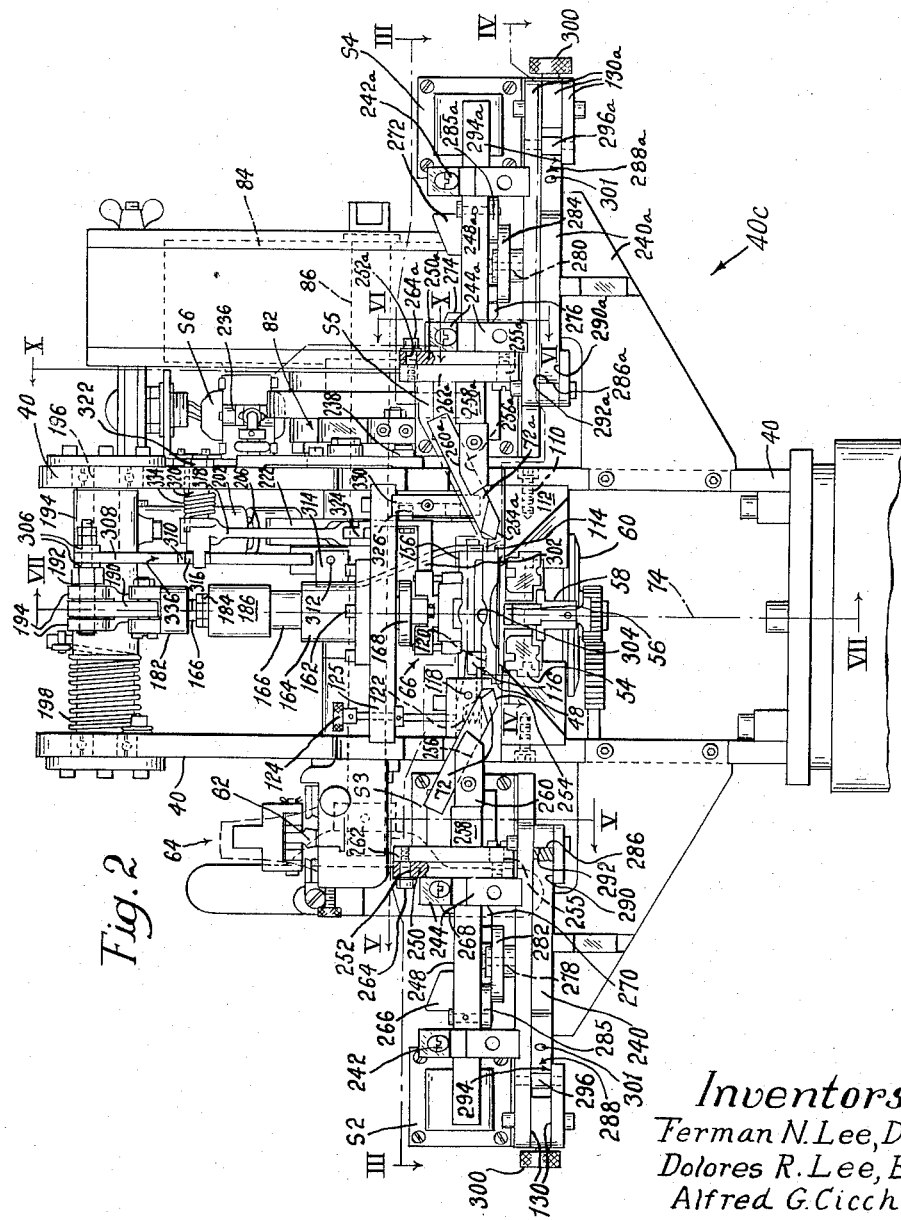
Fig. 2 shows in front elevation the operating head of the illustrative machine, safety covers of which have been removed to expose operating parts thereof.

Having closed the switch 382, as above described, to cause the work to be clamped against the crease plate 48, 48c, the operator further depresses the treadle 68 to cause the plunger 388 of the switch 344 to be moved in opposition to a spring of the switch by the arm 392 against the terminals of this switch and thus energizing, through a normally closed switch K2–A of a relay embodying a coil K2 hereinafter referred to, the solenoid S2 to cause the shoulder forming knife 72 to move inwardly toward the median plane 74 from its retracted starting position shown in Figs. 2 and 3 to form one of the heel breast receiving shoulders 44. The closing of the switch 384 also causes, through the normally closed switch K3–D of a relay embodying a coil K3, hereinafter referred to, a coil K1 to be energized thus closing normally open switches K1–A and K1–B of the relay embodying K1 and thus establishing a holding circuit for the solenoids S1 and S2 as well as for the coil K1 and thereby insuring that the work shall remain initially clamped in the machine and the knife 72 shall continue to move inward though the operator removes his foot from the treadle 68.

When the shoulder forming knife 72 reaches the inward limit of its shoulder forming stroke the cam link 270 (Fig. 3) has forced a roll 402 on a swinging lever 404 of the switch 76 to a position in which terminals of this switch are bridged, with the result that the coil K2 of the relay, which includes the normally closed switch K2–A and normally open switches K2–B and K2–C, is energized. The opening and closing of the switches K2–A and K2–B respectively causes the solenoids S2 and S3 to be de-energized and energized respectively with the result that the movement of the shoulder forming knife 72 is reversed, said knife moving outwardly or away from the vertical central plane 74 of the crease plates 48 back to its retracted position shown in Figs. 2 and 3. The closing of the normally open switch K2–C provides a holding circuit for maintaining the coil K2 energized after the terminals of the switch 76 become unbridged as the cam link 270 moves to the right, as viewed in Fig. 3.

The closing of the switch K2–B also effects, through the normally closed switch K3–A, the energizing of the solenoid S4 with the result that the shoulder forming knife 72a is moved inward toward the central heightwise plane 74 of the crease plate 48 to form the other heel breast receiving shoulder 44, said movement being simultaneous with the outward movement of the shoulder forming knife 72. As the shoulder forming knife 72a reaches the inward limit of its movement a roll 408 on a lever 410 of the switch 80 causes terminals of the switch to be bridged with the result that the solenoids S5 and S6 and the coil K3 of the above-mentioned relay are energized. The energizing of the coil K3 causes the immediate opening of normally closed switch K3–A thereby de-energizing the solenoid S4 and accordingly stopping inward movement of the shoulder forming knife 72a. The energizing of the solenoids S5 and S6 causes respectively the shoulder forming knife 72a to be moved outward to its retracted position and the clutch 82 to be tripped whereby to effect one rotation of the shaft 86 to cause the high face 414 of the cam 222 to operate upon the roll 218 to bulge the median portion and forward end portion of the heel seat portion 30 of the outsole 32 through the opening 50, 50c in the crease plate 48, 48c as shown in Figs. 17 and 18, and thereafter to move the heel seat reducing knife 94, 94c forward along the bottom face 52, 52c of the crease plate 48, 48c to form the heel seat tab 42, 42c. The energizing of the coil K3 also closes a normally open switch K3–C forming part of the relay including the coil K3 thus establishing a holding line maintaining the coil K3 and the solenoid S5 energized for a brief period, hereinafter referred to, after the switch 80 has been rendered open during inward movement of the cam link 276 and outward movement of the shoulder forming knife 72a. The relay embodying the coil K3 also embodies the switch K3–D the opening of which is retarded by a time delay unit (not shown). The opening of the switch K3–D causes the coil K1 to be de-energized and accordingly the circuit to be reset. The time delay in the switch K3–D is provided to insure that the surface 414 of the cam 220 shall be in engagement with the roll 218 before the circuit is reset and also to insure against any tendency for the shoulder forming knife 72a to "bounce" inward away from its retracted position as it arrives at such position.

As the shaft 86 completes its single rotation the roll 218 is forced, in response to movement of the torsion spring 198, into and against the bottom of the recess 220 thereby causing the outsole bulging and tab forming parts of the machine to stop at their proper retracted positions.

The two-part rod 202, 206 is provided to allow the surface 414 of the cam 222 to be brought smoothly against the roll 218 then in its dash line waiting position shown in Fig. 7. As the cam 222 moves clockwise, as viewed in Fig. 7, the roll 218 is first engaged by an actuating face 416 of the cam and by the time the face 414 of the cam engages the roll the faces 418, 420 of the rods 202, 206 respectively are in engagement with each other and the sleeve 186 on the rod 166 is in engagement with the top of the bearing boss 164, the flat T-shaped faces 92, 92c of the clamp and bulger 66 or 66c then being arranged just above the flat bottom faces 52 of the crease plates 48, 48c.

Figure 23:
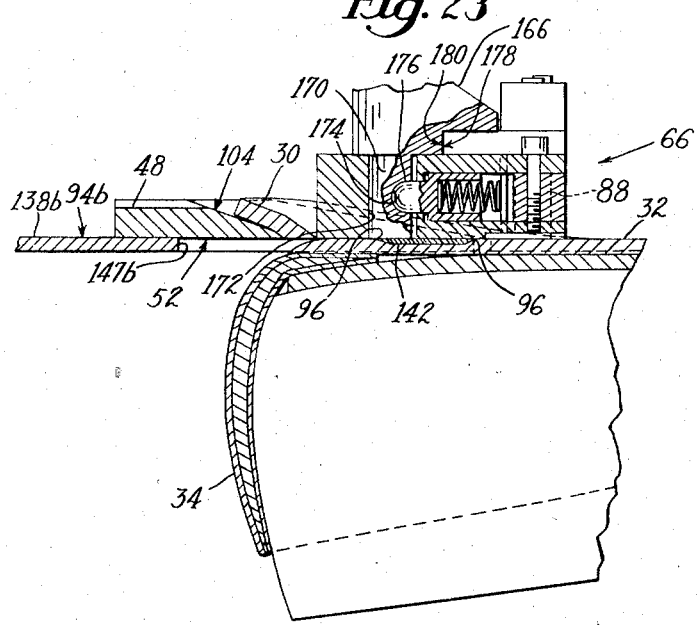
Fig. 23 is a section corresponding to the section shown in Fig. 17 showing the machine equipped with the knife illustrated in Fig. 22 in the process of forming a heel seat tab on an attached outsole of a shoe.
Figure 22:
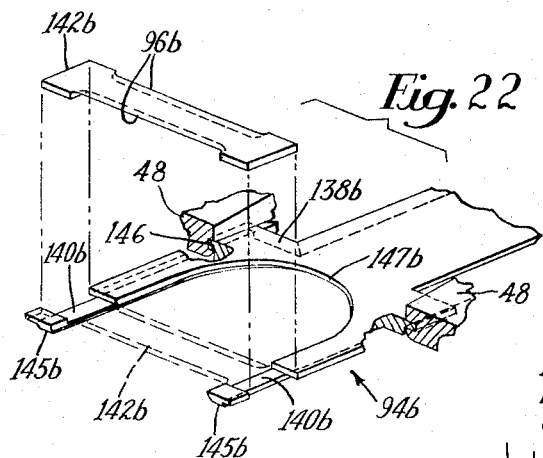
Fig. 22 is an exploded view showing in perspective a modified tab forming knife which may be used in place of the tab forming knife illustrated in Fig. 11.

The tab forming knife 94, during its forward or tab forming stroke, has a tendency to swing the heel end of the shoe downwardly about the breast edges 102 of the crease plate 48 to the dash line position shown in Fig. 17. In order to reduce this tendency to a minimum there is provided a modified heel seat reducing, back or tab forming knife 94b (Fig. 22) which is similar to the tab forming knife 94 except that it has a U-shaped opening or recess 147b extending thicknesswise through a holder portion 138b of the knife. The tab forming knife 94b has formed in laterally spaced, forwardly projecting fingers or finger portions 145b thereof, grooves 140b corresponding to the grooves 140 and a cutting blade 142b provided with cutting edges 96b. During the forward or tab forming stroke of the knife 94b the heel seat portion of the outsole of the shoe occupies the recess 147b as illustrated in Fig. 23 and accordingly the heel end of the shoe is not swung downwardly to any extent about the breast edges 102 of the crease plates 48. The tab forming knife 94b may be described as having an opening or a U-shaped opening 147b which extends thicknesswise through the holder portion 138b of the knife and which is substantially coextensive laterally of the holder with the cutting edges 96b of the knife blade 142b and which extends a substantial distance rearwardly of said blade. The opening 147b in the holder portion 138b may also be said to have a width as great as the transverse extent of the cutting edge 96b of the blade 142b. The knife 94b, which may be referred to as a drag knife, may be defined as having a leading transversely extending cutting edge 96b and as having extending thicknesswise through it an opening 147b which has a width substantially as great as the transverse extent of the cutting edge and extends a substantial distance lengthwise of the knife and which is spaced slightly from and rearwardly of said cutting edge of the knife.

Having thus described our invention what we claim as new and desire to secure by Letters Patent of the United States is:

1. In a heel seat fitting machine, a crease plate having an opening and a face bordering said opening, means for forcing the heel seat portion of an attached outsole of a shoe through said opening and beyond said face, a drag knife having a leading transversely extending cutting edge movable along said face of the crease plate to reduce the heel seat portion of the outsole, said knife having extending thicknesswise through it an opening which has a width substantially as great as a transverse extent of said cutting edge and extends a substantial distance lengthwise of the knife and which is spaced slightly from and is arranged rearwardly of said cutting edge and is adapted to receive the reduced heel seat portion of the outsole during the heel seat fitting operation, and means for operating the knife.

2. In a heel seat fitting machine, a plate which has an opening and a face bordering said opening and which is adapted for reception between an outsole and an upper of a shoe, said plate having formed along lateral margins of its face a pair of guideways extending lengthwise of the plate, means for forcing the median part of the heel seat portion of the outsole through the opening and beyond said face of the plate, a heel seat reducing knife having a leading cutting edge and a recess which is spaced slightly from and is arranged rearwardly of the cutting edge, and means for moving the knife forwardly along the outsole and along said face of the crease plate to cause said cutting edge of the knife to reduce the heel seat portion of the outsole, said recess in the knife being adapted to include the reduced heel seat portion of the outsole during the heel seat reducing movement of the knife.

3. In a heel seat fitting machine, a crease plate which has an opening and a face bordering said opening and which has a pair of guideways extending lengthwise of the crease plate along opposite lateral margins respectively of said face, means for forcing the median part of the heel seat portion of an outsole through said opening and beyond said face, and a knife having a holder lateral portions of which are adapted to fit slidingly in said guideways and which has a pair of laterally spaced forwardly projecting fingers which are provided with grooves and form between them an opening extending thicknesswise through said holder, said knife also comprising a planar blade which has a thickness substantially equal to the grooves formed in said fingers and which is adapted to fit slidingly in the guideways of the crease plate and has a cutting edge extending across said opening and substantially engaging said face of the crease plate as the knife moves along said guideways to form a heel seat tab, said opening extending a substantial distance rearward of the blade and being arranged in the same general plane of said blade and being adapted to receive a reduced heel seat tab of the outsole during the heel seat fitting operation.

4. In a heel seat fitting machine, a crease plate which has an opening and is adapted to support a heel seat portion of an attached outsole of a shoe, means for positioning said heel seat portion of the outsole upon the crease plate, means for clamping the positioned heel seat portion of the outsole against the crease plate, means for bulging the median part of the heel seat portion of the outsole through said opening, a pair of shoulder forming knives movable from retracted positions respectively transversely of the shoe to form heel breast receiving shoulders on said outsole, a tab forming knife movable lengthwise of the shoe along the crease plate, a manually actuated control lever, a first solenoid, means powered by said first solenoid and responsive to movement of the lever to one recognizable position for operating said clamping means whereby to force the heel seat portion of the outsole against the crease plate, a second solenoid, means responsive to movement of said lever to a second recognizable position for energizing said second solenoid to cause one of the shoulder forming knives to move inwardly from a retracted position to form one of the heel breast receiving shoulders on the outsole, third and fourth solenoids, means responsive to inward movement of said one shoulder forming knife to a predetermined position for de-energizing and energizing respectively said second and third solenoids for causing said one shoulder forming knife to reverse its movement and then to move outwardly to a retracted position and for energizing said fourth solenoid to cause the other shoulder forming knife to move inwardly from a retracted position to form the other heel breast receiving shoulder on the outsole, a fifth solenoid, means responsive to inward movement of said other shoulder forming knife to a predetermined position for de-energizing and energizing respectively said fourth and fifth solenoids whereby to cause said other shoulder forming knife to move outwardly to a retracted position, power operated mechanism comprising a one-revolution clutch, and a sixth solenoid energized in response to the operation of said last-named means and adapted to trip said one-revolution clutch whereby to render said power mechanism active to cause said bulging means to force the median part of the heel seat portion of the outsole through the opening in the crease plate and to cause the tab forming knife to reduce the heel seat portion of the outsole by a beveling cut.

5. In a heel seat fitting machine, a crease plate which is adapted to support the heel seat portion of an attached outsole of a shoe and which has an opening and a face bordering said opening, means for positioning said heel seat portion of the outsole on the crease plate, means for clamping the heel seat portion of the outsole against the crease plate, shoulder forming knives movable in paths extending transversely of the positioned outsole, means for bulging a median part of the heel seat portion of the outsole through said opening and beyond said face of the crease plate, a tab forming knife movable lengthwise of the crease plate along said face, power operated mechanism operatively connected to said bulging means and to the tab forming knife, manually actuated means movable to one recognizable position for rendering said clamping means effective to clamp the heel seat portion of the outsole against the crease plate, solenoid actuated means responsive to movement of said manually actuated means to a second recognizable position for moving the shoulder forming knives successively transversely of the outsole to form heel breast receiving shoulders upon the outsole, solenoid actuated means responsive to movement of one of said shoulder forming knives to a predetermined position for rendering said power operated mechanism active to cause said bulging means to force the median part of the heel seat portion of the outsole through the opening in the crease plate and beyond said face of the plate and thereafter to cause the tab forming knife to move along said face of the crease plate to reduce the heel seat portion of the outsole by a beveling cut.

6. In a heel seat fitting machine, means comprising a crease plate for positioning and clamping the heel seat portion of an attached outsole of a shoe, shoulder forming knives which are arranged at opposite sides of the outsole and are movable respectively toward and away from a heightwise median plane of the heel seat of the shoe, power means for moving one of the knives from a retracted position toward said plane to form a heel breast receiving shoulder on the outsole, power means responsive to movement of said one knife in said one direction for moving said knife away from said plane to a retracted position and for moving the other of said knives from a retracted position toward said plane to form a second heel breast receiving shoulder on the outsole of the shoe, and power means responsive to movement of said other knife toward said plane for moving said other knife away from said plane back to its retracted position.

7. In a heel seat fitting machine, means comprising a crease plate for positioning and supporting the heel seat portion of an attached outsole of a shoe, a clamp adapted to cooperate with the crease plate to secure said heel seat portion in a predetermined position, power means for operating said clamp, shoulder forming knives which are each arranged at opposite sides of the outsole and are movable toward and away from a heightwise median plane of the heel seat of the shoe, power means for moving one of the knives from a retracted position toward said plane to form a heel breast receiving shoulder on the outsole, power means responsive to movement of said one knife in said one direction for moving said knife away from said plane to its retracted position and for moving the other of said knives from a retracted position toward said plane to form a second heel breast receiving shoulder on the outsole of the shoe, power means responsive to movement of said other knife toward said plane for moving the other knife away from said plane back to its retracted position, and a manually actuated lever which is movable to one recognizable position to render said clamp operating power means active and which is movable to a second recognizable position for rendering said second-named power means active.

8. In a heel seat fitting machine, a crease plate, means for positioning a heel seat portion of an attached outsole of a shoe on the crease plate, means cooperating with the crease plate to deform said heel seat portion to a predetermined shape and to hold it so deformed, mechanism for operating said second-named means, means comprising a tab forming knife adapted to trim material from the margin of the heel seat portion of the outsole thus leaving a chip on the crease plate, an actuator lever which has a shoulder and is pivotally mounted upon said mechanism, a bell crank lever which has a pair of arms and is mounted for movement about a fixed axis, a lug secured to one of the arms of the bell crank lever, a spring for biasing the bell crank lever in one direction, a fixed cam having a guideway, an ejector which is pivotally connected to the other arm of the bell crank lever and has mounted on it a roll slidingly fitting in the guideway of the cam, and a member which is movable in response to the trimming movement of the tab forming knife and is adapted to move the actuator lever from a retracted inactive to a projected active position, said actuator lever being movable in response to movement of said mechanism after the heel seat tab has been formed to cause said shoulder of the actuator lever to engage the lug of said one arm of the bell crank lever whereby to cause the bell crank lever to rotate about its fixed axis against the action of said spring and thus to cause the ejector to move over the crease plate in a predetermined path controlled by the cam whereby to eject the chip from said plate, said lug as it is operated upon by the shoulder of the actuator lever being adapted to swing the actuator lever to a position in which the shoulder moves out of engagement with the lug thereby causing the ejector to be released from the actuator and accordingly to move under the action of the spring back to its retracted position away from the crease plate.

9. In a heel seat fitting machine, a crease plate which has a U-shaped opening and a face bordering said opening and which is adapted to be received between an attached outsole and an upper of a shoe, a clamp and bulger unit movable toward and away from the crease plate, a pair of shoulder forming knives arranged at opposite sides of the crease plate and adapted to be moved in opposite directions toward and away from a lengthwise median plane of the heel seat portion of the shoe positioned in the machine, a tab forming knife movable lengthwise of the crease plate, a first solenoid, mechanism which comprises a cam follower and is operatively connected to the solenoid and to the clamp and bulger unit, two pairs of solenoids for moving the shoulder forming knives respectively, the solenoids of said pairs being adapted to move associated shoulder forming knives in opposite directions respectively, a drive shaft, a cam having a recess and an actuating face, a power driven pulley, means for continuously driving said pulley, a one-revolution clutch for operatively connecting the pulley to the drive shaft and for disconnecting the pulley from said drive shaft, a solenoid for tripping the clutch, a manually actuated lever movable to a first recognizable position to energize the first solenoid whereby to operate said mechanism and thus move the cam follower from a retracted position against the bottom of the recess of the cam to a projected waiting position and accordingly to force the clamp and bulger unit against the heel seat portion of the outsole on the crease plate to secure said heel seat portion against said plate, said lever being movable to a second recognizable position to cause said solenoids of each of said pairs of solenoids to be energized in sequence and to cause the last energized solenoid of one of said pairs of solenoids to be energized with the first energized solenoid of the other pair whereby to cause the shoulder forming knives successively to form heel breast receiving shoulders on the outsole and then to cause the last-named solenoid to trip the clutch and thus to effect one rotation of the shaft whereby to force the actuating face of the cam against the cam follower to cause said mechanism to force the clamp and bulger unit against the crease plate with secondary clamping pressure, to bulge the median part of the heel seat portion of the outsole through the opening in the crease plate and beyond said face of the plate and thereafter to cause the tab forming knife to move along said face of the crease plate to form the heel seat tab.

References Cited in the file of this patent

UNITED STATES PATENTS

| | | |
|---|---|---|
| 1,980,371 | Bessom | Nov. 13, 1934 |
| 2,185,420 | Pratt | Jan. 2, 1940 |
| 2,215,524 | Hazelton | Sept. 24, 1940 |
| 2,323,407 | Miller et al. | July 6, 1943 |
| 2,463,852 | Carnes et al. | Mar. 8, 1949 |
| 2,778,041 | Charron | Jan. 22, 1957 |